United States Patent
Gourgey et al.

(10) Patent No.: US 7,106,220 B2
(45) Date of Patent: Sep. 12, 2006

(54) TACTILE GRAPHIC-BASED INTERACTIVE OVERLAY ASSEMBLY AND COMPUTER SYSTEM FOR THE VISUALLY IMPAIRED

(76) Inventors: Karen Gourgey, 55 W. 14th St. Apt. 4A, New York, NY (US) 10011; Steven Landau, 140 Jackson St., Brooklyn, NY (US) 11211

(*) Notice: Subject to any disclaimer, the term of this patent is extended or adjusted under 35 U.S.C. 154(b) by 764 days.

(21) Appl. No.: 10/245,815

(22) Filed: Sep. 17, 2002

(65) Prior Publication Data
US 2003/0098803 A1    May 29, 2003

Related U.S. Application Data

(60) Provisional application No. 60/323,416, filed on Sep. 18, 2001.

(51) Int. Cl.
*G09G 5/00* (2006.01)
*G06F 3/00* (2006.01)
*G06F 9/00* (2006.01)

(52) U.S. Cl. .................... 341/27; 715/702; 345/173
(58) Field of Classification Search ............. 341/21–22
See application file for complete search history.

(56) References Cited

U.S. PATENT DOCUMENTS

| | | | | |
|---|---|---|---|---|
| 5,283,559 A | * | 2/1994 | Kalendra et al. | 345/168 |
| 5,412,189 A | | 5/1995 | Cragun | 235/379 |
| 5,714,978 A | | 2/1998 | Yamanaka et al. | 345/157 |
| 5,736,978 A | | 4/1998 | Hasser et al. | 345/173 |
| 5,902,112 A | | 5/1999 | Mangold | 434/112 |
| 6,059,575 A | | 5/2000 | Murphy | 434/112 |
| 6,154,210 A | | 11/2000 | Anderson | 345/354 |
| 6,278,441 B1 | | 8/2001 | Gouzman et al. | 345/163 |
| 2001/0035880 A1 | | 11/2001 | Musatov et al. | |

OTHER PUBLICATIONS

Landau, Steven et al., Development of a talking Tactile Tablet, Information Technology and Disabilities, vol. 7, No. 2, Apr. 2001.
Nash, Sharon, Extrasensory Computing, PC Magazine Apr. 1999.

(Continued)

*Primary Examiner*—Jeffery Hofsass
*Assistant Examiner*—Kimberly Jenkins
(74) *Attorney, Agent, or Firm*—Darby & Darby

(57) ABSTRACT

A computer-based system permitting a visually impaired user to interact with tactile graphic-based interactive software applications is provided. The system includes a host computer having a data processor and a drive for running the interactive software applications and a pressure sensitive work pad. The work pad has X and Y pressure sensitive members disposed in a grid array for providing unique location output signals corresponding to each different location on the grid array. The work pad is operatively connected to the host computer and an overlay comprising a sheet is placed over an upper surface of the work pad. The overlay having a work space which bears tactile indicia which corresponds to a selected one of the interactive software applications and also includes a tactile graphical user interface (TGUI) formed thereon. The TGUI has a plurality of tactile control members which generate location output signals when pressed. These output signals are communicated to the computer which processes the signals as control signals directing the computer to perform an operation. Methods of calibrating the overlays and identifying the overlays are also provided.

24 Claims, 4 Drawing Sheets

OTHER PUBLICATIONS

Parkes, Don Ph.D., Multi-Media Audio-Tactile Maps and Plans, A SoundSpace for Blind Users with the Touchblaster Nomad System, International Tactual Mapping Commission Symposium, Feb. 1994.

Dodds, A.G., "Rehabilitating Blind and Visually Impaired People: A Psychological Approach" 1993.

Parkes, Don, Tactile Audio Tools for Graphicacy and Mobility "A circle is either a circle or it is not a circle." The British Journal of Visual Impairment, vol. 16, No. 3 Sep. 1998, pp. 99-104.

Parkes, Don, Access to Complex Environments for Blind People: Multi-Media Maps, Plans and Virtual Travel, Internation Conference Proceedings pp. 2449-2460, 1995.

Talking Maps, Science News, vol. 142, pp. 392-393, Dec. 1992.

http://www.tactileaudio.com/publications.htm, May 2004.

The World Blind, No. 9, Sep. 1992-Jun. 1993.

Parkes, Don et al. User Guide for Blind Mode, Bumpy Pictures 1997.

International Search Report.

Parkes, Don et al., Nomad: Tactile-Audio Graphics for Visually Impaired Children, Tadsem 1989.

\* cited by examiner

US 7,106,220 B2

TACTILE GRAPHIC-BASED INTERACTIVE OVERLAY ASSEMBLY AND COMPUTER SYSTEM FOR THE VISUALLY IMPAIRED

CROSS-REFERENCE TO RELATED APPLICATION

This application claims the benefit of U.S. Patent Application Ser. No. 60/323,416, filed Sep. 18, 2001, which is hereby incorporated by reference in its entirety.

TECHNICAL FIELD

The present application relates generally to devices for communicating information to a person with sight impairment, and more specifically, to a tactile sensing device connected to a host computer which allows a visually impaired user to interact with tactile graphic-based interactive multimedia applications.

BACKGROUND

Today's personal computers with graphical, "point and click" style interfaces, pose significant barriers to computer users with severe visual impairments (hereinafter referred to as the "visually impaired"). This is unfortunate as personal computers have gained widespread use in not only the business world but also in personal households. For example, personal computers increasingly serve an important role in the educational development of a child or an adult. Many software applications are designed to serve as educational tools in that the user improves one or more skills or learns new skills due to interaction with the particular application. Such applications range from instructional games for children to adult curriculum type applications as well as reference applications (e.g., encyclopedia software applications).

In an effort to increase the availability of computer software applications, different types of technology has developed over the years to allow greater communication of information to the visually impaired. System have been developed using synthetic speech, braille output and keyboard commands that allow people who cannot interpret video images to make use of computers in business and in education, including accessing the Internet and the Worldwide Web.

Tactile diagrams have long been used as aids to learning for people who are blind or visually impaired. They are useful, but in many cases, require either labeling, or audio assistance either from a human reader, or a pre-prepared audio cassette to enable the user to correctly understand the diagrams. Braille labeling is helpful to the 10 to 20% of the legally blind population who are competent readers; even for this group, however, the Braille takes up spaces that might otherwise be used to provide additional graphical detail.

More recent advances in the field include devices which are designed to provide a tactile presentation (e.g., pictures, maps and diagrams) to the visually impaired. However, some practicalities have always limited the usefulness and appeal of these devices. It is often difficult for a visually impaired person to make sense of tactile shapes and textures without some extra information to confirm or augment what has been touched. One method of providing extra information is to label the tactile presentation with Braille. However, these Braille tags must be large and have plenty of blank space around the tags for them to be legible, the use of tags is not particularly effective or useful with fairly complex or graphically rich images. Furthermore, reliance on Braille labeling restricts the usefulness of tactile graphics to the group of visually impaired individuals that are competent Braille readers which is a small population subset of the much larger population constituting visually impaired individuals.

One of the initial attempts to enrich the tactile graphic experience and allow for a broader range of users involved a touch screen device which was connected to a host computer. This type of device promised to enhance the tactile experience by allowing a user to view pictures, graphs, diagrams, etc., and then the user pressed on various tactile features to hear descriptions, labels, and other explanatory audio material. While this type of device enjoyed some success, it suffers from several drawbacks which has prevented the device from gaining widespread use and popularity. First, the device typically uses a touch sensitive surface having a low resolution, so precise correspondence of graphic images and audio tags is difficult to achieve. While this device often has a speech component, it is usually derived from a synthetic speech synthesizer. Synthesized speech is not as clear as more advanced recording techniques that are currently available and also is not as "user friendly" as pre-recorded human speech which is used in various multi-media software applications (e.g., CD ROMs).

Furthermore, these devices do not provide high quality interactive programming and tactile media that supports interactive learning and entertainment. What is needed in the art and has heretofore not been available is a audio-tactile device which overcomes the above-noted deficiencies and provides a high quality interactive experience for a visually impaired user.

SUMMARY

An interactive audio-tactile system is provided in the present application and allows visually impaired individuals to interact with tactile graphic-based multimedia applications. In one embodiment, the system includes a tactile sensing device, such as a pressure sensitive touch pad, which is communicatively connected to a host computer. The touch pad has a pressure sensitive X, Y coordinate array formed thereon as part of a touch surface so that pressure applied to a particular section of the touch pad causes a representative X, Y coordinate signal to be generated and communicated to the host computer. The computer is thus capable of monitoring the precise location of the user's finger on the touch pad. The system preferably includes digitized voice instructions for use which are stored as audio files and the computer accesses specific audio files as a particular application is run by the host computer. Using a digitized voice system exposes the user to a human-voice as compared to synthetic voice based systems which are not as pleasing to the ears of the user.

The touch pad receives a tactile graphic overlay and has a frame with a fastening mechanism or the like to hold the frame in a closed position so that the overlay lays motionless on the touch pad during use of the system. Different overlays are used for different interactive software applications which are run by the host computer. According to one aspect of the system, all of the overlays have common layout elements which permit the system to have standardized features regardless of which application is running.

The system incorporates a calibration process which ensures precise superimposition of the tactile graphics formed on the overlay over the sensitized regions of the touch pad. This ensures that the host computer properly reads the user's actions regardless of the precise position of the overlay on the touch pad. The system also has an identification process which permits the host computer to properly identify which overlay is disposed on the touch pad. Similarly, this ensures that the execution of the software application proceeds smoothly.

Accordingly, each overlay includes tactile elements which facilitate both the calibration and identification processes. These tactile elements are generally located in the same regions of each overlay so as to promote standardization of the layout of the overlays. In another aspect, each overlay is standardized in that each overlay contains a group of interactive tools formed in the same region of each overlay. Once again, this promotes familiarity of the system regardless of which application is being run by the user. These interactive tactile tools are adjacent to a workspace area which occupies the same space in each overlay so as to further promote standardization of the overlays.

The interactive tactile tools include raised tactile directional control buttons permitting the user to scroll through menus or the like which are announced by the human voice narrator. Other tactile tools include a back button/escape button, an enter button, and a fully operational tactile numerical keypad having standard numerical keypad boxes. Each overlay preferably includes other features in uniform locations which permit the user to easily and quickly identify one overlay from another overlay.

While the workspace area has a common boundary whose location does not change from one overlay to another overlay, the precise tactile subject matter which is presented within the workspace boundary does vary from overlay to overlay and therefore from application to application. Much of the tactile shapes and objects presented in the workspace area are a large part of the interactive learning process experienced by the user as the user is often touching different regions within the workspace in response to commands or instruction given by the narrator.

Any number of types of software applications may be run on the system as the system is designed to operate with the standard operating systems of today's personal computers. The standardization of the overlays permits the user to be comfortable with any number of graphic-based interactive multimedia applications which are based on the present system. Some exemplary tactile graphic-based interactive software applications include but are not limited to an audio/tactile atlas of world maps; educational curriculum applications; and instructional/entertainment game applications.

The system overcomes the deficiencies of the prior art devices and provides a system in which the computer interprets the user's presses on the tactile graphic overlay and manipulation of the tactile control tools in essentially the same way that the computer would do when a mouse is clicked while the cursor is over a particular region, icon or other object of a video screen associated with the computer. The present system thus opens the world of "point and click" computing to visually impaired users. Furthermore, the present system provides an improved system which allows visually impaired individuals to experience the benefits (both educationally and entertainment wise) of advanced graphic-based multimedia software applications that are similar to those software applications that are widely available to non-visually impaired individuals.

Other features and advantages of the present invention will be apparent from the following detailed description when read in conjunction with the accompanying drawings.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
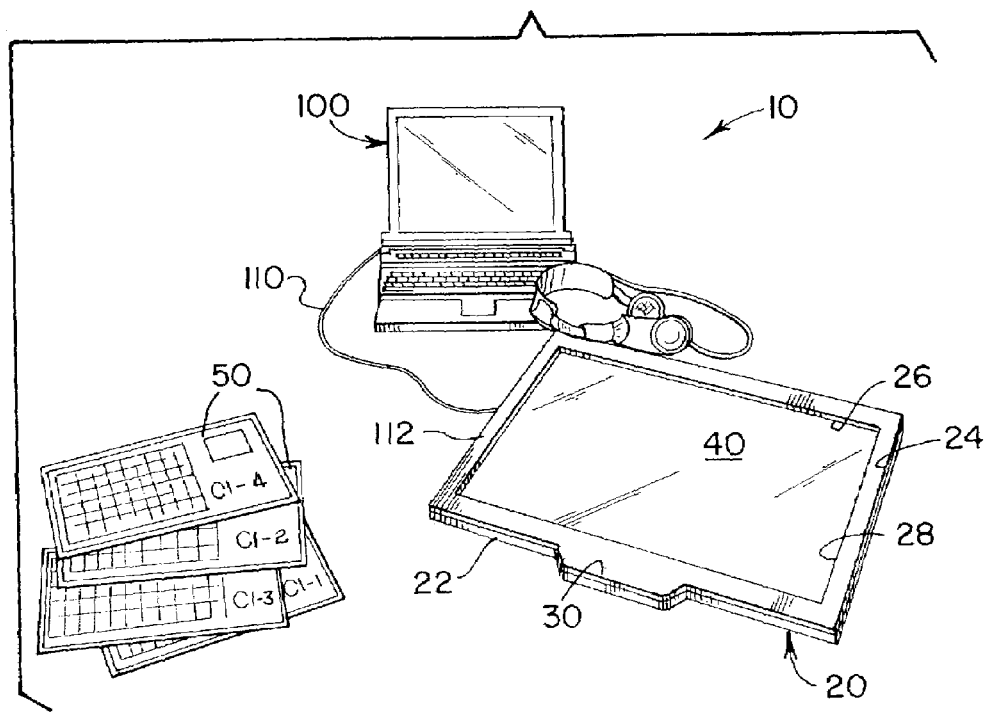
FIG. 1 is a perspective view of an interactive audio-tactile system according to one embodiment.

FIG. 1 is a perspective view of an interactive audio-tactile system according to one embodiment and generally indicated at 10. The system 10 includes a touch workpad 20 which is communicatively connected to a host computer 100. The touch workpad 20 has a housing 22 and includes a frame 24 hingedly connected thereto so that the frame 24 opens and closes relative to the housing 22. The exemplary frame 24 has a border section 26 which defines a rectangular shaped window 28. The adjustable frame 24 has a handle section or outwardly extending tab 30 formed at a front section of the housing 22 which is designed to face a user. The handle 30 is preferably integrally formed with the frame 24 and in one embodiment, the frame 24 and the handle 30 are a single integral member. The handle 30 is hingedly connected to the frame 24 at one or more locations. The handle 30 permits the user to easily grip the front of the frame 24 and lift the frame 24 up so that the frame 24 opens relative to the housing 22.

The touch workpad 20 has a touch surface or touch pad 40 which is a pressure sensitive planar surface. More specifically, the touch pad 40 of the workpad 20 is an uppermost work surface which faces the frame 24 and is viewable through the window 28 when the frame 24 is in a closed position, as shown in FIG. 1. As will be described in greater detail hereinafter, a touch overlay 50 or template (best shown in FIG. 2) is disposed over the touch pad 40. The user simply opens the frame 24 upward and then places one overlay 50 on the touch pad 40 before closing the frame 24. Any number of fastening mechanisms can be used to make sure that the frame 24 remains releasably secured to the housing 22. For example, magnets (not shown) may be strategically placed on an inner surface of the frame 24 with complementary attractive magnetic members being disposed in the housing 22 such that the magnets are drawn to one another which permits the frame 24 to be releasably secured to the housing 22. Other types of fastening mechanisms include but are not limited to latch mechanisms, hook and loop devices, lock mechanisms, etc. The fastening mechanism should hold the overlay 50 motionless once the frame 24 is closed and secured to the housing 22.

As previously-mentioned, touch pad 40 is a pressure sensitive planar surface and typically is in the form of a standard hardened-glass touch screen. Such screens have found widespread use in a variety of applications, including automated teller machines (ATMs) and other user interactive devices. Generally, the touch pad 40 includes a pressure sensitive X, Y coordinate array formed therein so that when pressure is applied to a particular section of the touch pad 40, a representative X, Y coordinate signal is generated in response. Often times, pressure sensitive surfaces include a number of vertical X (X1, X2, X3, . . . Xn) and horizontal Y (Y1, Y2, Y3, . . . Yn) conductors (not shown) covering the entire planar pressure sensitive surface. Thus, when the user applies pressure to the planar surface (touch pad 40), the user is contacting a particular region having corresponding X and Y coordinates. The precise region which has been depressed can therefore be easily determined and mapped by its X and Y coordinates and then communicated to the host computer 100.

When vertical and horizontal conductors are used, they are typically connected using a bus assembly (not shown). In other words, the vertical X conductors are connected through an X bus and the horizontal Y conductors are connected through a Y bus (not shown). The bus assembly may also include a multiplexer (not shown), whereby the X bus and Y bus are connected to the multiplexer to permit the precise X, Y coordinates to be detected and a representative signal to be generated. One will appreciate that this type of bus assembly is merely one exemplary type of system for detecting a location with a high degree of precision along a pressure sensitive surface.

In one embodiment, the touch pad 40 is a pressure sensitive array of horizontal and vertical lines. The precise number of horizontal and vertical lines used in the touch pad 40 varies according to the resolution of the touch pad 40. Once the resolution of the touch pad 40 is known, an X-Y coordinate grid can be constructed. For example, if the horizontal resolution is 300 lines and the vertical resolution is 200 lines, the top left corner of the touch pad 40 is location 0, 0. The bottom left is, for example, location 0, 199; the top right location is, for example, location 299, 0; and the bottom right location is, for example, location 299, 199.

In one exemplary embodiment, the touch workpad 20 is a device which is commercially available from Elotouch of Fremont, Calif. under the trade name Accutouch. The Accutouch is a 5-wire resistive touchscreen which provided a high resolution pressure sensitive touch screen based on the above-described X, Y coordinate system.

The touch workpad 20 is connected to the host computer 100 using a cable 110. Advantageously, only a single cable 110 is needed to provide the communication link between the touch workpad 20 and the host computer 100. The cable 110 is connected between a workpad interface 112 and a PC interface (not shown). For example, the PC interface is the host computer's USB (universal serial bus) port. A USB controller card (not shown) is preferably housed in a compact enclosure "in-line" on the cable 110. It will also be appreciated that the touch workpad 20 can be connected in a wireless manner to the host computer 100 using wireless communications technology.

The host computer 100 includes standard devices, such as a CPU, ROM, disk storage, a memory which stores an operating system and exemplary application programs. In one embodiment, the host computer 100 has a device driver installed on the computer's hard disk drive to control communications between the touch pad 40 and the host computer 100. The touch workpad 20 is designed so that it may be connected to a host computer 100 that runs in either Windows (Microsoft Corporation, Redmond, Wash.) or Macintosh (Apple Computer, Inc., Cupertino, Calif.) environments. This permits the system 10 to have widespread use as it is compatible with the vast majority of PCs that are commercially available.

The operation of the system 10 will be briefly described. The system 10 is run by launching any number of tailored software applications which are intended for use with the system 10. The program files may be stored on a CD ROM disc or they may be stored in the hard drive of the host computer 100. For the purpose of illustration only, the program files will be described as being stored on a CD ROM. The user places a chosen CD ROM in a drive of the host computer 100 and starts a standard "launcher" program. The use of such launcher programs are well known to those skilled in the art and serve to "launch" the particular application. According to one aspect of the system 10, the CD ROM has a number of audio files stored thereon which are accessed at predetermined times as the user maneuvers through a particular application. Preferably, the audio files have stored thereon digitized speech segments which are generated by having a human being read preselected text which is then recorded as audio segments on an associated storage medium (in this case files stored on the CD ROM or alternatively, files stored in the hard drive of the PC). The use of digitized speech segments provides a more pleasing environment for the visually impaired user in comparison to synthesized voice segments. Digitized speech conveys the information to the user using a welcoming speech tone as though an actual human being was standing near the user and actually speaking in a pleasing tone to the user. This results in the user feeling more comfortable with the system 10 and the increased focus and attention of the user results in a more enjoyable and more successful learning and/or entertainment session.

Figure 2:
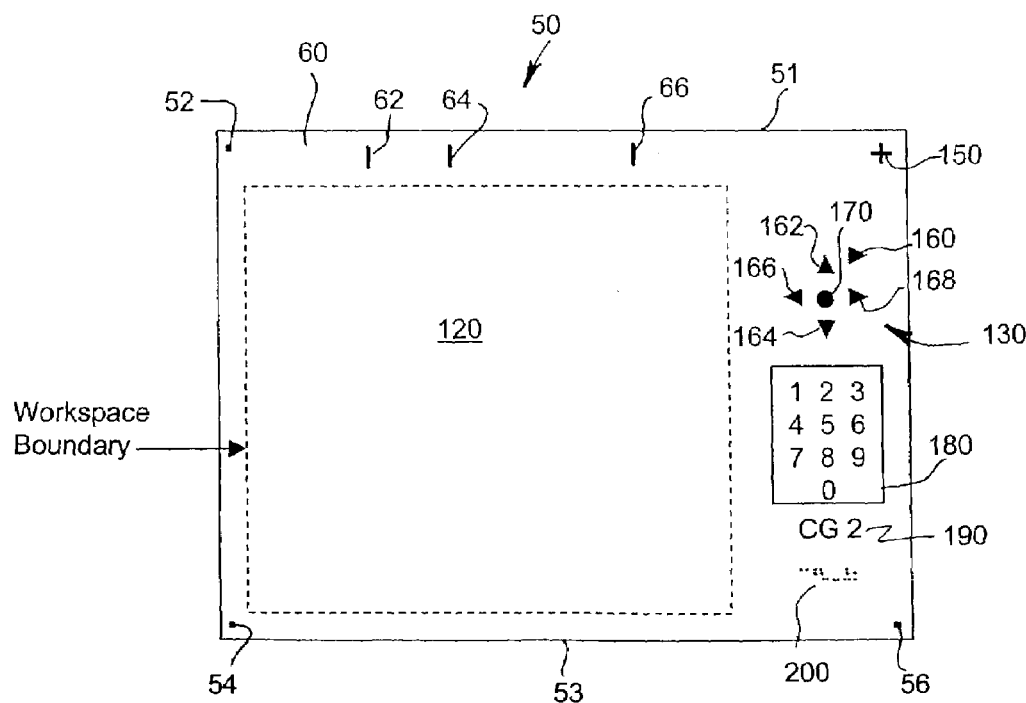
FIG. 2 is a plan view of an exemplary overlay with a standard user interface section and workspace for use with a touch workpad of FIG. 1.

Referring to FIGS. 1 and 2, the touch overlay 50 is a tactile sheet which is intended for use with pressure sensitive devices, such as touch workpad 20. Touch overlays 50 are commercially available from a number of sources and come in a variety of colors, textures, sizes, etc. In one embodiment, the overlays 50 are color-printed vacuum-thermo-formed PVC tactile drawing overlay sheet (typically at least a portion of the overlay 50 is transparent). It will be appreciated that the overlay 50 should have complementary dimensions with respect to the housing 22 and the frame 24. The dimensions of overlay 50 should be such that it can be received underneath the frame 24 and more specifically, the overlay 50 extends between the border 26 of the frame 24 so that it occupies the entire window 28.

FIG. 2 illustrates a basic touch overlay 50 prior to being decorated with specific tactile details that are associated with one or more interactive software programs. All of the touch overlays 50 have the following similar components. First, the touch overlay 50 has one or more calibration tactile members. The exemplary overlay 50 in FIG. 2 has three tactile members, namely first, second and third calibration tactile members 52, 54, and 56. The calibration tactile members 52, 54, 56 are in the form of defined projections which extend outwardly from a first surface 51 of the overlay 50. The first surface 51 is the surface which faces the user when the overlay 50 is placed and secured within the touch workpad 20. An opposing second surface 53 is the surface of the overlay 50 which contacts the touch pad 40 during use of the system 10.

The calibration tactile members 52, 54, 56 can come in a variety of sizes and shapes so long as the user can easily locate the members 52, 54, 56 by touch. The calibration tactile members 52, 54, 56 do not necessarily have to be identical in form in that each of the members 52, 54, 56 may be slightly different to permit the user to easily differentiate one member from another member. For example, the first member 52 may have a greater height than the other members with the third member 56 having the smallest height. Alternatively, the members 52, 54, 56 may each have a different shape. In the exemplary embodiment of FIG. 2, the members 52, 54, 56 are raised calibration dots formed in three corners of the overlay 50. The first member 52 is formed in the upper-left corner, the second member 54 is formed in the lower-left corner, and the third member 56 is formed in the lower-right corner.

The overlay 50 also has an identification space 60 formed as a defined region of the overlay 50. In the exemplary embodiment, the identification space 60 is located in an upper region of the overlay to the right of the first calibration member 52. The identification space 60 is an elongated region extending across the overlay 50. The identification space 60 has one or more tactile identification members formed within the identification space 60 at one or more predefined locations. In one exemplary embodiment, the one or more tactile identification members comprise three vertical identification bars, namely a first identification bar 62, a second identification bar 64, and a third identification bar 66. Each of the bars 62, 64, 66 is a raised bar that projects from the first surface 51 so that the user can easily locate the three bars 62, 64, 66 by moving his or her finger along the identification space 60. The three identification bars 62, 64, 66 act as identification bars because the relative position of the three bars 62, 64, 66 within the identification space 60 is unique for each overlay 50. The identification bars 62, 64, 66 thus act as a coded name tag for the overlay 50 and is easily read by the host computer 100.

The process of calibrating and identifying a particular overlay 50 will now be described in detail with reference to FIGS. 1 and 2. After the user has launched a particular program application as by inserting a CD ROM into the drive of the host computer 100, a digitized-voice narrator leads the user through the setup process and audio confirmation is provided as each step is successfully completed. The narrator directs the user to place a particular overlay 50 onto the touch pad 40 depending upon which application is being run. After placing the overlay 50 onto the touch pad 40 and closing and securing the frame 24, the user begins a calibration process. It is important that the overlay 50 lay motionless during a session as movement of the overlay 50 during a session will compromise precision as each section of the overlay 50 corresponds to an section of the touch pad 40 underneath the overlay 50.

Preferably, upon closing the frame 24, the narrator directs the user to touch and press each of the members 52, 54, 56 to perform the calibration process. In other words, the user will be asked to press each of the members 52, 54, 56 with sufficient force so that each of the members 52, 54, 56 causes the touch pad 40 to locally deform. As each member 52, 54, 56 is successfully pressed, a confirming audio tone is preferably sounded. As each calibration member 52, 54, 56 is pressed, the pressed member causes a precise localized region of the touch pad 40 to deform. This localized region has at least one associated X, Y coordinate. In other words, pressing the first calibration member 52 causes the touch pad 40 to also become locally compressed at a distinct X, Y coordinate location. The X, Y coordinates on the touch pad 40 which correspond to the location of the first member 52 are delivered from the touch workpad 20 to the host computer 100 through the cable 110. The pressing of the members 52, 54, 56 results in the host computer 100 identifying and storing the precise locations of the members 52, 54, 56 relative to the X, Y coordinates of the touch pad 40.

While, the members 52, 54, 56 may be touched in sequential order beginning with the first member 52 and ending with the third member 56, the members 52, 54, 56 may be touched in any order so long as each of the members 52, 54, 56 is touched and the host computer 100 detects and registers the contact between the user and the members 52, 54, 56.

Once the precise locations of the calibration members 52, 54, 56 are known to the host computer 100, a correction factor that compensates for any discrepancy between the measured and idealized positions of the overlay is applied to every subsequent pressing action of the user. For example, the idealized location for the first member 52 may be the X10, Y5 coordinate; while the measured location of the first member 52 during the calibration process is the X8, Y5 coordinate. In other words, the first member 52 is displaced two X coordinates to the left of the idealized location for the first member 52. Thus, the host computer 100 will apply a correction factor for each subsequent pressing action of the user. For example, if the user contacts the overlay 50 at a location which corresponds to the X290, Y150 coordinate of the touch pad 40, the host computer will automatically apply the correction factor and read this as the X288, Y150 coordinate.

This calibration step is important due to the use of high resolution equipment, e.g., the touch workpad 20. Precise superimposition of the tactile shapes of the overlay 50 over the pressure sensitized regions of the touch screen (touch pad 40) must be achieved to guarantee correspondence of tactile objects formed on the overlay 50 to appropriate audio responses. This is especially true for applications which have complex graphic images.

The importance of calibration is readily seen in the process of identifying which particular overlay 50 is disposed on the touch pad 40. This identification process serves to instruct the host computer 100 which overlay 50 has been selected out of a large number of overlays 50 that are stored in a library or the like, thereby permitting all of the overlays 50 associated with a number of applications can be segregated from one another but also stored together. The narrator will prompt the user to begin the identification process. At this time, the user runs his or her finger along the identification space 60 from left to right and as the user encounters each of the identification members 62, 64, 66, the user is instructed to press the respective member downward toward the touch pad 40.

The pressing of each of the identification members 62, 64, 66 results in the host computer 100 detecting and recording the measured X, Y coordinate location of each of these members 62, 64, 66 and then the correction factor is applied to each of the coordinate locations. This results in corrected X, Y coordinate locations being determined for each of the identification members 62, 64, 66. Because the relative locations of the three identification members 62, 64, 66 within the identification space 60 is unique to the overlay 50, the corresponding X, Y coordinate locations for the members 62, 64, 66 define a code which is easily read by the host computer 100. Once the third identification member 66 is pressed, the host computer 100 searches one or more database files and matches the read code with a stored code that has an associated title for the overlay 50. After matching the overlay 50, the narrator announces the application's title and the sheet number of the overlay 50.

Without the calibration process of the system 10, misidentification of overlays 50 would likely result as is the case in the use of many of the conventional pressure sensitive overlay devices. If the overlay 50 is positioned slightly askew relative to its ideal position on the touch pad 40, the host computer 100 will receive a code which does not correspond to the overlay 50 currently in use. This potentially results in a different and incorrect application being run by the host computer 100 and at the very least, the overlay 50 on the touch pad 40 does not correlate to the overlay 50 which the host computer 100 interprets as being on the touch pad 40.

Referring to FIG. 2, each overlay 50 also has a workspace section 120 and a tactile graphical user interface (TGUI) 130 outside of the workspace section 120. Both of these features of the overlay 50 are standard from one overlay 50 to the next overlay 50. Such standardization leads to familiarity with the system 10 even when the application itself is varied. By not modifying the location of the workspace section 120 and the TGUI 130, the user does not have to continuously learn the workspace location and type of tools formed on each overlay 50. The user thus will be able to easily maneuver between applications as the actual interface which the user uses to navigate through the application is standard from one application to another. This is important as one of the disadvantages of prior overlay devices is that the layout of the overlays is not standard from one overlay to another overlay. Unfamiliar overlay tools and/or locations of the tools causes the user to first identify the differences between the overlays 50 before proceeding. This results in wasted time and possibly frustration by the user.

In the exemplary embodiment, the workspace section 120 occupies the greatest area of the overlay 50 and is rectangular shaped and lies below the identification space 60 and to the left of the TGUI 130, which occupies the right portion of the overlay 50. The exemplary TGUI 130 extends from the top-right corner down to the bottom-right corner. The TGUI 130 provides the user with a set of standard tools which permit the user to easily and effectively navigate through any of the different applications.

Figure 3:
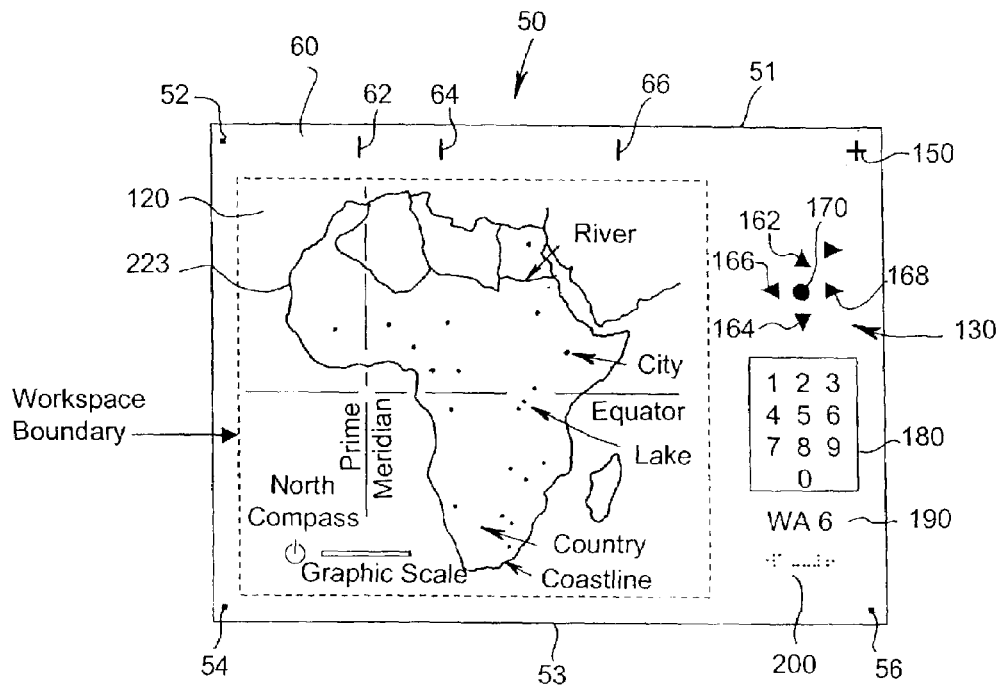
FIG. 3 is a plan view of an exemplary geography overlay.
Figure 4:
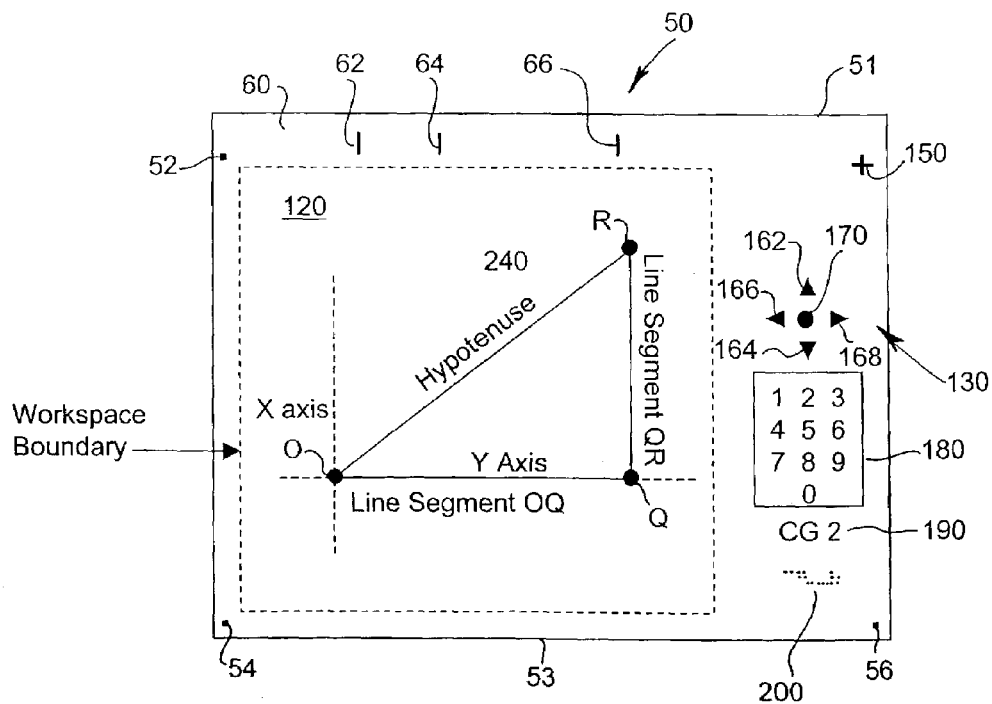
FIG. 4 is a plan view of an exemplary curriculum overlay (in this case geometry)
Figure 5:
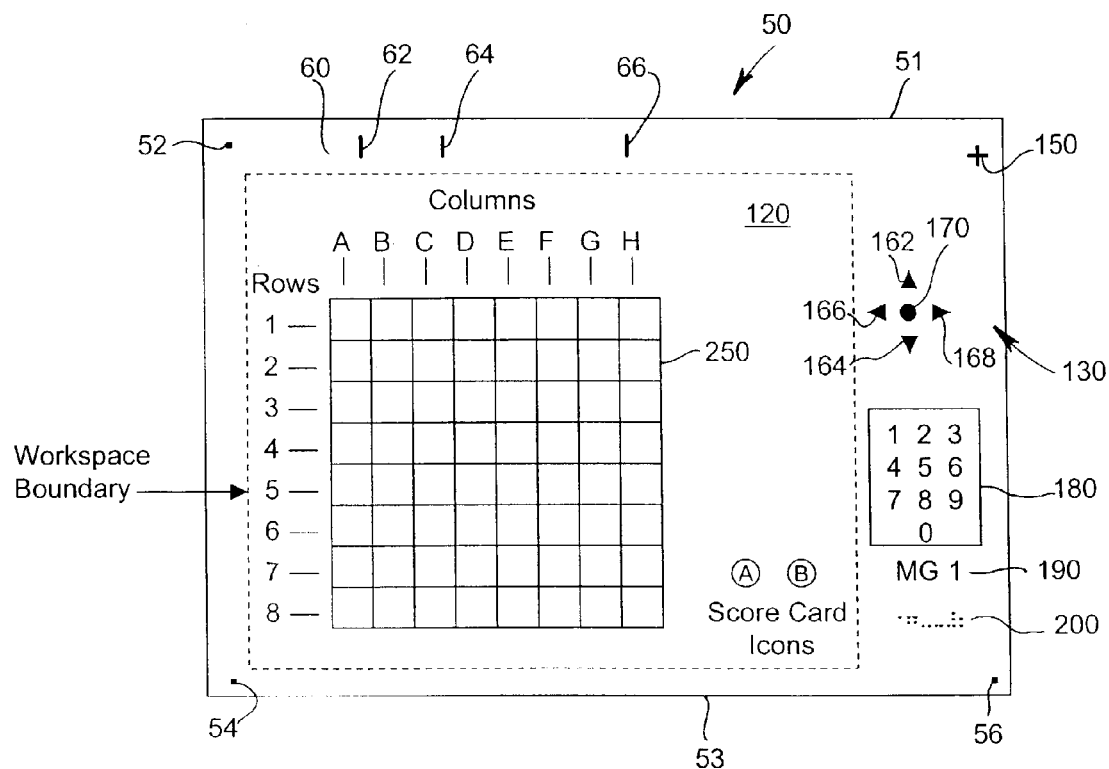
FIG. 5 is a plan view of an exemplary game overlay.

The exemplary TGUI 130 includes a first tactile button 150 which performs one or more operations. The first tactile button 150 is located in an upper-right corner of the overlay 50 and in the exemplary embodiment, is in the shape of a "+" sign. As with the other tactile members of the overlay 50, the first tactile button 150 extends outwardly from the overlay 50 toward the user so that the user can easily locate the member 150 by running his or her finger over the overlay 50. In each application, pressing the first tactile button 150 performs an operation and because the system 10 is advantageously standardized, pressing the first tactile button 150 performs the same or similar operations regardless of which application is currently running. For example and according to one exemplary embodiment, the first tactile button 150 operates as a back button if it is pressed once and operates as an escape button if the member 150 is pressed twice. These features will be further elaborated on in detail when FIGS. 3–5 are described.

Formed below the first tactile button 150 is a set of tactile control buttons, generally indicated at 160. The set of buttons 160 includes directional arrow buttons and an enter button 170 in the center of the directional arrow buttons. The directional arrow buttons include an up button 162, a down button 164, a left button 166, and a right button 168. Each of these directional buttons 162, 164, 166, 168 is preferably in the form of a raised arrow head so as to indicate that the buttons act as directional control buttons which permit the user to move through applications in the direction that the arrow head is pointing. As those who are familiar with computer applications will understand, many times the user is confronted with a menu which requires the user to scroll through the menu in order to highlight or otherwise indicate that a desired action is to be taken. This often requires the user to scroll up and down menu entries by using directional arrow buttons, such as buttons 162 and 164.

In the exemplary embodiment, the enter button 170 is a raised circular shaped button formed in the center of the directional control buttons 162, 164, 166, 168. Pressing the enter button 170 performs essentially the same operation that is achieved when an enter or return key is pressed on a standard computer keyboard.

Formed below the directional buttons 162, 164, 166, 168 and the enter button 170 is a numerical keypad, generally indicated at 180. The numerical keypad 180 has a raised boundary 181 with boxes arranged in a standard numerical keypad manner. The blocks are differentiated from one another by a border walls which separate one box from adjacent boxes. These border walls may be the same height as the raised boundary 181 or they may have a height which differs from the height of the raised boundary 181 (e.g., the border walls have a height less than the raised boundary 181). The keypad 180 preferably has a standard layout with the "1" box being in the upper-left corner and the "3" box being in the upper-right corner. The lowermost row is formed of an asterisk symbol "*" in the lower-left corner of the keypad 180 and the pound "#" symbol is formed in the lower-right corner. In the center box between the asterisk symbol and the pound symbol is the numeral "0".

Indicia may be formed on the top of each box so as to allow the visually impaired user to more easily identify which box his or her finger is resting upon. For example, the top of each box may have a raised number which corresponds to the value of the box (e.g., a "1" or a raised symbol, such as an asterisk or pound symbol). Alternatively, the indicia may comprise other types of symbols that are readily recognizable to the visually impaired.

The TGUI 130 also includes indicia which permits a user to easily identify the particular overlay 50 by touch. In one exemplary embodiment, this indicia is a raised-print plate number 190 and a Braille plate number 200. The raised-print plate number 190 is formed just below the keypad 180 and the Braille plate number 200 is formed just below the raised-print plate number 190 but above the third calibration member 56. The raised-print plate number 190 is a distinct letter or numerical combination which uniquely identifies the overlay 50. The raised-print plate number 190 may also be formed of a combination of letters and numbers as illustrated in FIG. 2. For example, the exemplary overlay 50 of FIG. 2 has a raised-print plate number 190 in the form of "CG 2". The raised-print plate number 190 is formed in any number of ways so long as the letters and/or numbers are raised enough for the user to be able to distinguish and read the raised-print plate number 190.

The raised-print plate number 190 and the Braille plate number 200 may be used in combination or one may be read exclusively by the user to identify the particular overlay 50. Because not all visually impaired individuals are Braille literate, the raised-print plate number 190 is provided. Those individuals that are Braille literate may simply use the Braille plate number 200 exclusively to identify the particular overlay 50. Both the raised-print plate number 190 and the Braille plate number 200 serve an important purpose because it is expected that a number of overlays 50 will be stored together. Accordingly, each of these plate numbers 190, 200 provides an easy and effective manner for the user to quickly identify one overlay 50 from another overlay 50. This will greatly increase the overall speed at which the user can navigate through a particular application as a particular application will typically require the user to sequentially remove overlays 50 and replace different overlays 50 on the touch pad 40.

In the operation of the system 10, the user will be asked to confirm that the overlay 50 that is in place on the touch pad 40 and has been identified by the narrator is the intended overlay. If the overlay 50 is the correct one, the user can simply reply to the narrator by pressing the enter button 170. If the overlay 50 is not the correct one, the user can simply lift up the frame 24 and remove the overlay 50 and then search the other overlays 50 for the correct overlay 50. For an experienced user, it is expected that the entire set-up process (e.g., placing an overlay 50 and performing the calibration and identification processes) should take less than 30 seconds.

At appropriate moments during a session, the user may be asked to place a new tactile overlay 50 on the touch pad 40. After placing the new tactile overlay 50 on the touch pad 40, the calibration and identification routines, described above, are repeated. This process continues until the user decides to end a particular section by pressing the first tactile button 150 in the upper-right corner of the overlay 50. In one embodiment, the first tactile button 150 performs both a back stepping operation and an escape or quit operation. In this embodiment, pressing the first tactile button 150 once causes the application to return to a previous menu or the like, if applicable. Pressing the first tactile button 150 twice causes the application to terminate (quit function) and the system 10 shuts down until the user begins a new session.

The workspace section 120 is the section of the overlay 50 that is not standard from one overlay 50 to another overlay 50. Depending upon the particular application, the tactile graphical environment of the workspace section 120 varies. FIGS. 3–5 illustrate exemplary overlays 50 that are used in three different types of exemplary applications.

Figure 3A:
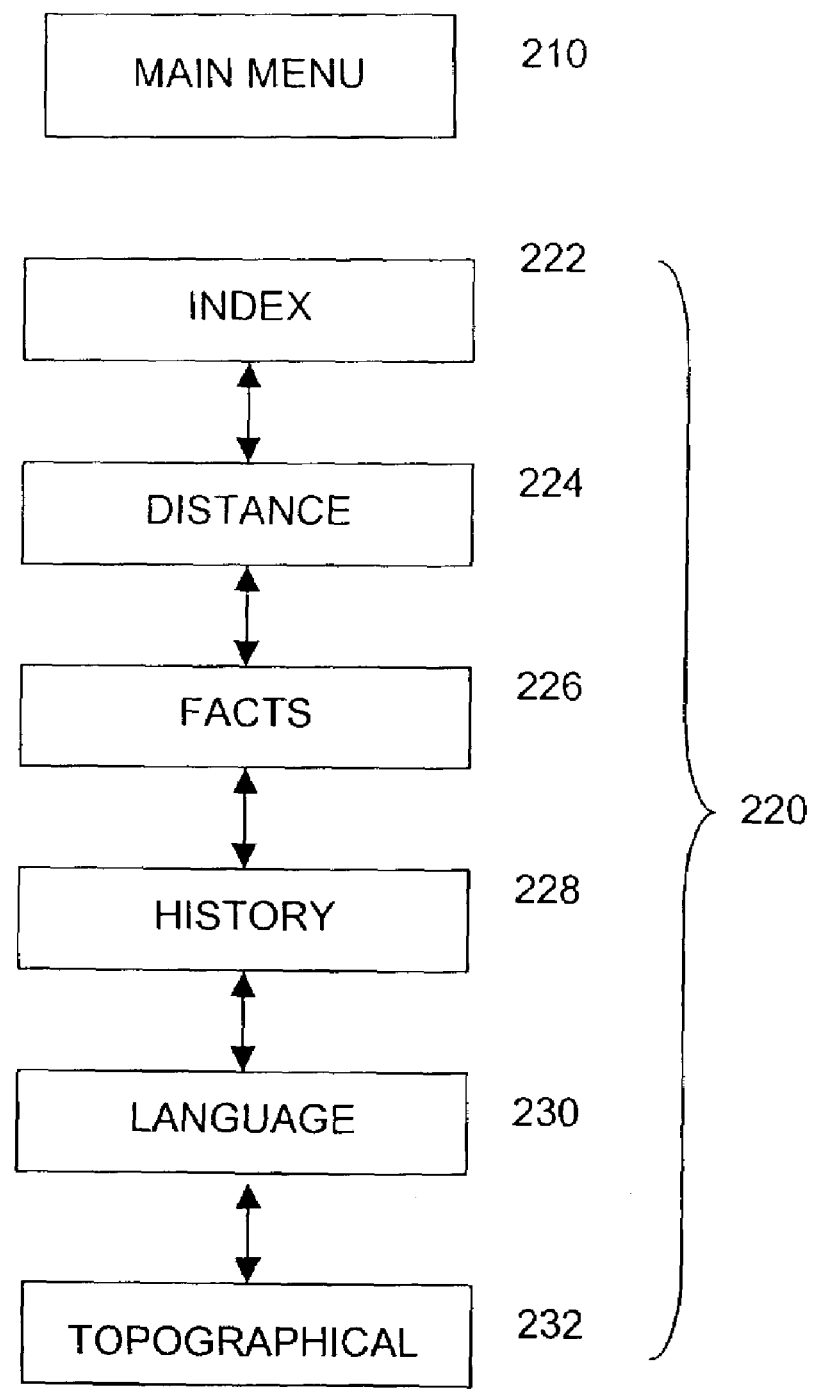
FIG. 3A is a schematic flow diagram of a main menu of a geography application.

FIG. 3 is an overlay 50 for a geographic application that is appropriately referred to as providing a "talking tactile atlas of world maps". FIG. 3A illustrates a main menu 210 of this world atlas application. To access the main menu 210, the user can simply press the enter button 170 when prompted by the narrator or the user can press the first tactile button 150 at any time during the world atlas application to access the main menu 210. Once the user is in the main menu 210, the user scrolls up and down the menu options, generally indicated at 220, which act as tools for the particular application running. The exemplary main menu 210 includes six different menu tools 220, namely an index tool 222, a distance tool 224, a facts tool 226, a history tool 228, a language tool 230, a topographical tool 232. The user scrolls through the menu tools 220 using the up button 162 and the down button 164. As the user navigates from one menu tool 220 to another menu tool 220, the narrator will announce which menu tool 220 is currently highlighted. Once the user highlights a desired menu tool 220, the user then selects the tool by pressing the enter button 170. Optionally, the application may be written so that the narrator announces a confirmatory message that requires an action by the user. In other words, the user will hear a confirmatory message like "You have selected the distance tool, if this is correct, please press the enter button". In this situation, the user will simply press the enter button 170 if the correct tool has been chosen.

Each of the menu tools 220 will now be described. For purpose of illustration, FIG. 3 shows the continent of Africa in the workspace 120. It will be appreciated that the atlas application has a number of overlays 50 which are tactile representations of the world. For example, one overlay 50 could be a large scale map of the entire world with each continent being illustrated in detail on a separate overlay 50. Overlays 50 can also be provided showing the geography of a particular single country and/or a single city. Other geographical maps can be provided in the form of overlays 50 (e.g., map of the Great Lakes). Each overlay 50 has a tactile environment. For example, the African continent illustrated in FIG. 3 has a raised boundary 223 marking the boundaries of the continent, as well as raised boundaries 225 between countries. The raised boundaries 225 may be of the same height as the raised boundary 223; however, the raised boundaries 225 preferably have a height less than the raised boundary 223. This permits the user to easily distinguish, by touch, the continental boundary 223 as compared to a boundary 225 between countries (or states, provinces, cities, towns, etc.).

When the user selects the index tool 222 from the main menu 210, the user is presented with an alphabetical index of entries which are specific to the particular overlay 50 which is currently in use. For example, when the African continent overlay 50 (FIG. 3) is in use, the index entries are an alphabetical list of the countries of Africa. The index tool 222 is a user interactive tool in that the user can scroll up and down the index entries using the up button 162 and the down button 164. As with other applications, as the user scrolls from one index entry to another index entry, the narrator announces the new entry (e.g., "You have located the country of South Africa"). Once the user navigates to a desired country, the user then presses the enter button 170.

The user then places his or her finger on the workspace 120 and the precise location of the finger is determined in terms of this location's X, Y coordinates (due to the touch pad 40 of FIG. 1 being locally compressed by the finger). Because the host computer 100 knows which overlay 50 is currently being used, the program application is able to determine the precise finger location within the tactile map of the overlay 50. The precise X, Y coordinates for the continental and country boundaries are stored so that the host computer 100 is able to immediately determine the finger location on the tactile map and whether the user's finger is first within the boundaries of Africa and subsequently which particular country (which optionally can be announced) the user's finger is contacting.

The narrator will guide the user to the chosen country (e.g., South Africa) by a series of audio commands (e.g., move up, down, left or right). For example, suppose the user initially places his or her finger within the boundaries of the country of Botswana, the narrator would optionally indicate this to the user and then direct the user to "move down" as Botswana borders South Africa directly to the north. Once the user has successfully located South Africa, the narrator will announce so and preferably delivers a congratulatory announcement, such as "Congratulations, you have successfully located the country of South Africa".

If the user desires to try to locate another country or continue to scroll through the index entries, the user simply presses either the up button 162 or the down button 164. The narrator will then announce the newly highlighted index entry. Once a desired entry is highlighted, the user simply presses the enter button 170. This user then attempts to locate this new selection in the same manner described above.

If the user wishes to exit the index tool 222 and return to the main menu 210, the user presses the first tactile button 150 once. This will bring the user back to the main menu 210. The user then scrolls up or down the main menu 210 using the up and down buttons 162, 164, respectively. For purpose of illustration, assume that the user next selects the distance tool 224. The distance tool 224 serves to calculate the distance between any two locations which have been targeted by the user. The user first touches the overlay 50 at a given location and the narrator preferably announces the location (e.g., "This is the country of Chad"). Once the user locates a first target location, the user presses the enter button 170. The user then selects the second target location (e.g., South Africa) and confirms that this is correct by using the enter button 170. The host computer 100 will then calculate the distance between the two chosen locations and plays a recorded message to the user (e.g., "The shortest distance between Chad and South Africa is X miles"). If the user wishes to make another calculation, the user simply touches the overlay 50 again and confirms two more target locations. If the user wishes to exit this tool, the user presses the first tactile button 150 once. To exit the application, the first tactile button 150 is pressed twice.

The facts tool 226 offers the user access to a database of facts for every country, body of water, continent, planet, etc. After the user selects the tact tool 226, the user can either scroll though entries using the up and down buttons 162, 164, respectively, and then select a chosen entry by pressing the enter button 170 or the user can simply place his or her finger on the overlay 50. The X, Y coordinate of the user's finger will be detected by the host computer 100 and the user will be asked to confirm that the user wishes to access facts relating to the highlighted country, body of water, city, etc.

The operations of the other tools are identical to the above operations as standardization of the system 10 is desired. The history tool 228 allows the user to move through a time line of important events from every country and continent. The language tool 230 plays an audio clip of the language spoken in every country around the world. For example, if the user selects South Africa either by touching the overlay 50 or by scrolling through a menu and then the user confirms such selection using the enter button 170, the narrator will indicate that the languages of English, Afrikaans, seSotho, isiXhosa and isiZulu are the most commonly spoken. It will be appreciated that other features can easily be built into the system. For example, audio clips of a greeting in one of the languages may be played after selection thereof.

The topographical tool 232 allows the user to explore a "sound painting" of a country or region. Elevations are assigned to graduated pitch tones, so that as the user taps around on the tactile map (overlay 50), the user hears low-pitches to denote areas that are below sea-level, with ascending tones to indicate higher regions. The highest tone is reserved for a mountain.

It will also be appreciated that the main menu 210 is readily adaptable and each of the tools 220 themselves are adaptable. Additional features are therefore easily added to a given application. For example, the index tool 222 may contain not only entries for the overlay 50 which is detected by the host computer 100 as being in place on the touch pad 40 but also may contain entries relating to other overlays 50. For instance, the index tool 222 could contain a list of all countries in the world even though the overlay 50 in place is for Africa. If the user selects a continent or country outside of those present on the overlay 50 (e.g., the United States), the user will be told by the narrator that the user has selected the United States and to please confirm this selection by pressing the enter button 170. If the user desires to go to the United States map, the user will press the enter button 170 and then will be instructed to place a different overlay 50 on the touch pad 40 using the process discussed earlier. Once the correct overlay 50 is placed on touch pad 40, the narrator will indicate this to the user.

FIG. 4 is a plan view of an overlay 50 for another application. This application is an educational application which includes an instructional curriculum. One of the most difficulty challenges for a visually impaired individual who desires to enter a technical or scientific profession is mastery of "spatial" math, such as Geometry, Trigonometry, and Graphing. Since math education is cumulative, it is very difficult, if not impossible, for a visually impaired student to succeed at Calculus (which is needed for college-level studies in engineering and most sciences) without a good grounding in these foundation areas ("Pre-Calculus curriculum"). Through the use of audio-tactile computing, it becomes possible to describe concepts that must be mastered before going forward in math studies.

Accordingly, this exemplary Pre-Calculus curriculum application contains lessons that the user can move through at his or her own pace with the lessons containing interactive examples that allow the user to plug in values and then listen as the computer solves problems in a step-by-step fashion. Topics covered include: the coordinate grid, distance formula, slope, and equations of lines. At the end of each section, a set of exercises allows the student to demonstrate the mastery of the material before going forward to the next section or the user can go back for further review and additional instruction and/or problem solving.

The exemplary overlay 50 illustrated in FIG. 4 is from a coordinate Geometry curriculum lesson. This is prominently displayed by the raised-print plate number 190 (CG 2) and the Braille plate number 200 which corresponds to the plate identification CG 2. The workspace 120 has a tactile geometric representation formed of raised lines and points. In this instance, a tactile X-Y coordinate system is formed on the overlay 50 and includes an X axis and a Y axis. This particular overlay 50 is intended to instruct and teach the user about a coordinate grid, use of the Pythagorean Theorem to calculate the distance between any two points, delta notation, equations of lines, and slope.

In the overlay 50 of FIG. 4, a triangle 240 is formed and is defined by points O, Q, and R. Due to its tactile nature, the user can touch the overlay 50 and learn about the X axis, Y axis, line segments (e.g., line segment OQ) and other geometrical facts. As with the other applications, this application is based on the user touching the overlay 50 causing the touch pad 40 to be pressed down in a particular local region. The host computer 100 (FIG. 1) then determines the X, Y coordinates corresponding to the region of the touch pad 40 which is compressed. Because the host computer 100 knows the identity of the particular overlay 50 on the touch pad 40, the host computer 100 knows precisely which structure the user's finger is resting on in the overlay 50. For example, the narrator will announce that the user has contacted line segment OQ when the user presses along any portion of this line segment OQ.

By using the keypad 180, the user can enter values associated with the particular work session and the host computer 100 will use these values to solve equations and the like as a means for instructing the user according to the curriculum basics. As with the other applications, the user will be preferably asked to confirm the inputted information by pressing the enter button 170 and the user can scroll through various options using the up button 162, down button 164, left button 166 and right button 168, as well as the back button (first tactile button) 150.

FIG. 5 illustrates yet another application intended for use in the system 10 (FIG. 1). This application has both entertainment and educational value. This exemplary application is a tactile/audio memory game that allows visually impaired children to compete with one another or to play alone. The game is essentially a match game and includes a board 250 having a series of boxes arranged in a checkerboard arrangement. The board 250 has a number of rows (in this case eight which are numbered from 1 to 8) and a number of columns (in this case eight which are identified by letters A to H). The intersection between any one of the columns and any one of the rows identifies a particular box.

The goal of the game is to match pairs of animal sounds (or any other type of distinctive sounds or audio bits) which are "hidden" in the grid of boxes. Thus, there should be an even number of boxes so that each box has a corresponding box and the mated boxes form one pair. The game provides entertainment and intellectual challenge in a setting where visual impairment does not put the player at a disadvantage. Playing the match game also helps develop spatial imaging skills since the successful player must build and maintain a mental picture of the placement of hidden sounds around the playing board 250. Each time the game is played, the host computer 100 randomly assigns the animal sounds to the boxes in the grid.

To begin the game, the user will likely be asked to identify the number of individuals that will be playing (from 1 to a predetermined number). After the user has inputted this information using the keypad 180 and/or the tactile directional control buttons 160 and the enter button 170, the narrator announces that the game is about to begin. The narrator will prompt each player when it is his or her turn to make selections. When the player is prompted, the player makes a first selection by pressing a particular box on the board 250. As soon as the player contacts the box, the X, Y coordinates of the selection are detected and sent from the touch pad 40 to the host computer 100. The host computer 100 then plays the associated audio bit (e.g., animal sound) for the selected box. The player then makes a second selection with the goal being to find the same animal sound as was just played when the first box selection was made.

If the player does not make a match when he or she makes the second box selection, the narrator will preferably say "Sorry this is not a match". The next player will then be prompted to make his or her box selections. When a match is made, the narrator will make an announcement such as "Congratulations, you made a successful match" and the player will be instructed to make two more box selections. Once a match is made, the two boxes that constituted the match will become inactive boxes in that a later selection of either of these boxes will not generate an animal sound but will generate another type of sound to alert the player that the boxes have already been matched. This process is continued until all of the boxes have been matched.

The host computer 100 keeps score for each player as to the number of matches that each player has successfully achieved. It will be apparent that this game tests the memory of the player as a successful player will recall the general box locations and hopefully the precise box locations of earlier animal sounds.

It will also be appreciated that this application may be easily adaptable to provide additional functionality, such as skill settings and bonus rounds, etc. For example and according to one embodiment, three skill settings are possible. These skill levels may be based on the size of the grid. In other words, the skill level of the game can be increased by increasing the number of boxes of the grid or conversely, the skill level of the game can be decreased by reducing the number of boxes in the grid. A bonus round can also be offered to the winner of each game, whereby the player is given an opportunity to earn additional points.

Furthermore, the tactile control buttons 160 can be designed to permit the user to access additional advance functionality of the application. For example, the player can use the tactile control buttons 160 to scroll through menus, such as a scoring menu, which provide the player with useful information. A scoring menu would present each player with his or her current score and permit one player to keep tract of the scores of the other players. The player may also be instructed as to how many pairs have been matched and how many pairs are left to be matched.

Optionally, each application contains a so called "expert mode" which bypasses all but the essential instructions and audio cues. This is in contrast to the standard operating mode in which a user, especially a first time user, is presented with a complete description of the system 10 and its features and is led in a step-by-step fashion through the process of launching the application. It will be appreciated that the expert option can be activated in any number of ways during start-up of the system, including instructing the user to press a particular button on the overlay 50.

The system 10 may be started in any number of conventional methods, including switches, etc. In one embodiment, once the user presses the first tactile button 150 twice, the application which was previously running is terminated and the system 10 shuts down. If the user wishes to restart the system 10, the user simply needs to press any region of the overlay 50 for a predetermined period of time (e.g., three seconds) without interruption. The host computer 100 is programmed so that this action causes the host computer 100 to reboot and run the application which is currently in its drive or otherwise indicated as being the selected application. Alternatively, the system 10 can be started by holding down a button formed on the overlay for a predetermined period of time, e.g., three seconds or more.

The number of potential applications which can be designed to work with the system 10 and more specifically, be designed to work with the touch pad 40 and the host computer 100, are essentially limitless. For example, other potential applications include a Web page interpreter for improving access to the Internet through an audio/tactile browser; an adventure game for building sound-localization skills through the use of spatially accurate three-dimensionally binaural audio, as players move through a virtual environment; spreadsheet builder and reader for improving access to Microsoft Excel using an audio/tactile representation of alphanumeric grids; standardized math assessment delivery system for improving access for blind visually impaired students in high-stakes testing; voting device for allowing the visually impaired to independently (and privately) register choices for elected officials; and an authoring system for allowing teachers to create their own audio-tagged tactile drawings.

Advantageously, the system 10 of FIG. 1 provides a standardized system for tactile graphic-based interactive multimedia applications. Because system 10 uses hardware that is commercially available, it is relatively easy to assembly and use and is also of relatively low cost. The range of professionally-produced software titles that are available or will be available and the high quality of these multimedia applications are additional advantages of the present system 10. By developing a uniform, standardized approach for tactile graphic-based interactive multimedia applications, users have instant familiarity with the operation of the application and only have to learn the specifics of the new application.

Figure 6:
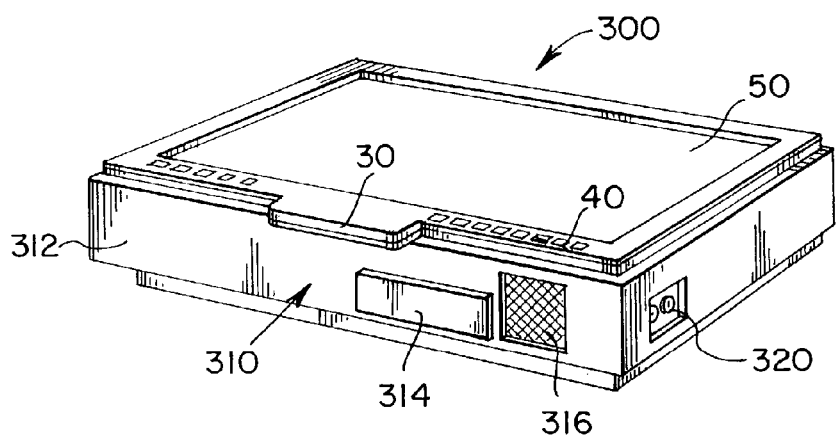
FIG. 6 is a perspective view of an interactive audio-tactile system according to another embodiment.

FIG. 6 illustrates another embodiment of an interactive audio-tactile system 300. System 300 is similar to system 10 of FIG. 1 in terms of how it operations and manner in which the user interacts with the system; however, system 300 is a completely free-standing version. In this embodiment, the touch workpad 40 is set into a computer device 310 which is commonly referred to as being a computer "docking station". The computer device 310 has a housing 312 which incorporates a single board computer, a hard disc drive 314, audio system 316 and connections 320 to peripheral devices (not shown).

In this embodiment, the touch pad 40 is received into and locked to the computer device 310. The CD ROM is then loaded into the drive 314 to launch the chosen application or the application is launched using other conventional means. The user then places the appropriate overlay 50 on the touch workpad 40 by lifting the frame 24 and then placing the overlay 50 underneath. The user then continues in the identical manner as in system 10. In other words, the user responds to prompts given by the narrator.

This embodiment is more compact and permits easy transportation of the device 300 while not jeopardizing any of its capabilities. In both embodiments, the computer (either host computer 100 or computer device 310) interprets the user's presses on the tactile graphic overlay 50 in exactly the same way that it does when a mouse (not shown) is clicked while the cursor is over a particular region, icon or other object of a video screen associated with the computer. The present systems thus opens the world of "point and click" computing to visually impaired users.

While the invention has been particularly shown and described with reference to preferred embodiments thereof, it will be understood by those skilled in the art that various changes in form and details may be made therein without departing from the spirit and scope of the invention.

What is claimed is:

1. A computer-based system permitting a visually impaired user to interact with tactile graphic-based interactive software applications, the system comprising: a host computer having a data processor and a drive for running the interactive software applications; a pressure sensitive work pad having X and Y pressure sensitive members disposed in a grid array for providing unique location output signals corresponding to each different location on the grid array, the work pad being operatively connected to the host computer, and an overlay comprising a sheet for placement over an upper surface of the work pad, the overlay having a work space which bears tactile indicia which corresponds to a selected one of the interactive software applications, the overlay including a tactile graphical user interface (TGUI) formed thereon, the TGUI having a plurality of tactile control members, each tactile control member having associated X and Y coordinates on the grid array, the application of force to the respective tactile control member causing a corresponding location output signal to be generated and communicated to the host computer which processes the corresponding location output signal as a control signal which directs the performance of an operation, wherein the work space and TGUI occupy different regions of the overlay, wherein the overlay has a tactile identification region that is a section of the overlay, with one or more tactile identification members being fixedly formed on a surface of the overlay within the identification region at select, fixed X and Y coordinates, the relative position of the one or more tactile identification members within the identification region providing an identification pattern which uniquely identifies the overlay.

2. The system of claim 1, wherein the identification region occupies a top portion of the overlay and the one or more tactile identification members comprise plurality of raised tactile identification bars that are formed at fixed locations along the overlay surface.

3. The system of claim 2, wherein the identification bars are spaced from one another and are arranged in a parallel relationship with respect to one another.

4. The system of claim 2, wherein each identification bar has at least one associated X and Y coordinate measured on the grid array of the work pad, the X and Y coordinates of the identification bars defining an overlay identification code which uniquely identifies the overlay, the identification code being read by the host computer when force is applied to each of the identification bars causing contact with the work pad, the output signals generated by the work pad defining the identification code.

5. The system of claim 1, wherein the overlay has a calibration system for instructing the host computer of the precise location of the overlay on the work pad.

6. The system of claim 5, wherein the calibration system includes a plurality of tactile calibration members formed on the overlay and arranged according to a predetermined pattern.

7. The system of claim 6, wherein the data processor which receives location output signals generated when the plurality of tactile calibration members are pressed causing the work pad to generate corresponding calibration output signals, the calibration output signals indicating the present X and Y coordinates of each of the tactile calibration members.

8. The system of claim 7, wherein the data processor has a memory for storing the X and Y coordinates of the tactile calibration members, the host computer having stored therein a set of optimized X and Y coordinates identifying an optimized location of the tactile calibration members relative to the work pad, the data processor serving to compare the present X and Y coordinates of the calibration members with the set of optimized X and Y coordinates and then determine a correction factor that compensates for any difference between the present X and Y coordinates of the calibration members and the stored set of optimized X and Y coordinates for the calibration members.

9. The system of claim 8, wherein the correction factor is applied to each location output signal generated by the work pad after the system has been calibrated, thereby forming a corrected location output signal which is processed by the host computer in accordance with the software application.

10. The system of claim 1, wherein the plurality of tactile control members are formed at fixed locations on the overlay surface and includes a set for tactile directional arrow members, the activation of which is communicated to the host computer such that the user is provided with a scrollable menu associated with the software application and a tactile enter member permitting the user to convey an affirmative command to the host computer.

11. The system of claim 10, wherein the plurality of tactile control members further includes a tactile alpha-numeric keypad divided into a plurality of boxes being defined by tactile boundaries.

12. The system of claim 1, wherein the overlay includes a tactile plate number which provides unique identification indicia for each overlay.

13. The system of claim 12, wherein the unique identification indicia comprises a combination of raised-print letters and numbers which uniquely identify the overlay.

14. The system of claim 1, wherein the overlay further includes a Braille plate number uniquely identifying the overlay using Braille indicia.

15. The system of claim 12, wherein the overlay further includes a Braille plate number uniquely identifying the overlay in Braille, the Braille plate number corresponding to the tactile plate number.

16. The system of claim 1, wherein the work space occupies a first region of the overlay and the TGUI occupies a second region of the overlay, the first and second regions being in the same locations on each overlay regardless of the identity of the software application.

17. A system including an overlay for use with a pressure sensitive work pad having an upper surface defined by an X and Y coordinate grid array for providing unique location output signals corresponding to each different location on the grid array, the work pad being operatively connected to a computer, the overlay comprising: a sheet for placement over the upper surface of the work pad, the overlay having a work space which bears tactile indicia which corresponds to a selected software application, the overlay including a tactile graphical user interface (TGUI) formed thereon, the TGUI having a plurality of raised tactile control buttons that are formed on the overlay surface at fixed locations, each tactile control button causing an input signal to be generated when the respective tactile control button is pressed and contacts the upper surface of the work pad, the control signal being communicated to the computer which processes the input signal and performs one or more operations, wherein at least one of the operations is providing a scrollable menu that is associated with the selected software application.

18. In a system a having a host computer and a pressure sensitive work pad operatively connected to the host computer and a tactile overlay in the form of a sheet for placement over an upper surface of the work pad, the computer having a data processor and a drive for running the interactive software applications, the work pad having X and Y pressure sensitive members disposed in a grid array for providing unique location output signals corresponding to each different location on the grid array, a method of identifying one overlay from another overlay comprising the steps of: storing in a memory of the host computer a unique identifying code for each overlay; providing an identification region on the overlay; forming a plurality of identification members within the identification region according to a unique pattern and at fixed locations on a surface of the overlay within the identification region, each identification member having associated X and Y coordinates on the grid array where the relative positions of the identification members uniquely identify the overlay; disposing the overlay over the upper surface of the work pad; applying force to each of the identification members causing output signals to be generated by the work pad, the output signals being communicated to a data processor of the host computer, the output signals defining the unique identifying code; and comparing the received unique identifying code to identifying codes stored in memory and if a match is achieved, the host computer indicating that the overlay has been identified.

19. The system of claim 1, wherein the X and Y coordinates that correspond to the fixed relative positions of the identification bars within the identification region define a unique identification code for the overlay that is read by the host computer when the identification bars are depressed according to a predetermined manner.

20. The system of claim 19, wherein the predetermined manner comprises the pressing of the identification bars in a left to right direction.

21. The system of claim 1, wherein the control member includes a button formed on the surface of the overlay and being programmed in combination with the computer to perform more than one operation depending on how many times the button is pressed by a user.

22. The system of claim 17, wherein the selected software is configured to permit a user to select from a plurality of menu tools that are accessed from the main menu by manipulation of the fixed control buttons.

23. A computer-based system permitting a visually impaired user to interact with tactile graphic-based interactive software applications, the system comprising: a host computer
having a data processor and a drive for running the interactive software applications; a pressure sensitive work pad having X and Y pressure sensitive members disposed in a grid array for providing unique location output signals corresponding to each different location on the grid array, the work pad being operatively connected to the host computer, and an overlay comprising a sheet for placement over an upper surface of the work pad, the overlay having a work space which bears tactile indicia which corresponds to a selected one of the interactive software applications, the overlay including a tactile graphical user interface (TGUI) formed thereon, the TGUI having a plurality of tactile control members, each tactile control member having associated X and Y coordinates on the grid array, the application of force to the respective tactile control member causing a corresponding location output signal to be generated and communicated to the host computer which processes the corresponding location output signal as a control signal which directs the performance of an operation, wherein the work space and TGUI occupy different regions of the overlay, wherein the overlay has a tactile identification region that is a section of the overlay, with a plurality of tactile identification members being fixed on a surface of the overlay within the identification region at select X and Y coordinates, the relative position of the tactile identification members within the identification region providing an identification pattern that uniquely identifies the overlay, wherein the identification members are located outside of a work space that contains raised indicia formed on the overlay surface that is unique to a specific overlay.

24. A computer-based system permitting a visually impaired user to interact with tactile graphic-based interactive software applications, the system comprising: a host computer having a data processor and a drive for running the interactive software applications; a pressure sensitive work pad having X and Y pressure sensitive members disposed in a grid array for providing unique location output signals corresponding to each different location on the grid array, the work pad being operatively connected to the host computer, and an overlay comprising a sheet for placement over an upper surface of the work pad, the overlay having a work space which bears tactile indicia which corresponds to a selected one of the interactive software applications, the overlay including a tactile graphical user interface (TGUI) formed thereon, the TGUI having a plurality of tactile control members, each tactile control member having associated X and Y coordinates on the grid array, the application of force to the respective tactile control member causing a corresponding location output signal to be generated and communicated to the host computer which processes the corresponding location output signal as a control signal which directs the performance of an operation, wherein the work space and TGUI occupy different regions of the overlay, wherein the overlay has a tactile identification region that is a section of the overlay, with a plurality of tactile identification members being formed on a surface of the overlay within the identification region at select X and Y coordinates, wherein the distances between the tactile identification members within the identification region vary for each individual overlay, with the relative positions of the identification members defining an identification code which is fixed and unique for the each overlay and serves to identify each individual overlay to the host computer once the members are pressed successively according to a prescribed order.

* * * * *